(12) United States Patent
Dingler et al.

(10) Patent No.: US 9,124,469 B2
(45) Date of Patent: *Sep. 1, 2015

(54) SYSTEM AND METHOD TO INITIATE A PRESENCE DRIVEN PEER TO PEER COMMUNICATIONS SESSION ON NON-IMS AND IMS NETWORKS

(71) Applicant: INTERNATIONAL BUSINESS MACHINES CORPORATION, Armonk, NY (US)

(72) Inventors: John R. Dingler, Dallas, GA (US); Sri Ramanathan, Lutz, FL (US); Matthew A. Terry, Celebration, FL (US); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/946,237

(22) Filed: Jul. 19, 2013

(65) Prior Publication Data

US 2013/0308631 A1    Nov. 21, 2013

Related U.S. Application Data

(63) Continuation of application No. 12/326,361, filed on Dec. 2, 2008, now Pat. No. 8,542,674.

(51) Int. Cl.
*H04L 29/06* (2006.01)
*H04L 12/14* (2006.01)
(Continued)

(52) U.S. Cl.
CPC .......... *H04L 29/06217* (2013.01); *H04L 12/14* (2013.01); *H04L 12/1403* (2013.01); *H04L 12/1428* (2013.01); *H04L 12/5815* (2013.01); *H04L 12/5855* (2013.01); *H04L 51/043* (2013.01); *H04L 51/14* (2013.01); *H04L 65/1016* (2013.01); *H04L 65/1069* (2013.01); *H04L 67/24* (2013.01); *H04M 3/2218* (2013.01); *H04M 3/4211* (2013.01); *H04M 3/42374* (2013.01); *H04L 12/589* (2013.01)

(58) Field of Classification Search
None
See application file for complete search history.

(56) References Cited

U.S. PATENT DOCUMENTS 7,310,532 B2   12/2007   Knauerhase et al.
2005/0027867 A1   2/2005   Mueller et al.
(Continued)

OTHER PUBLICATIONS

Reichl et al., "Practical Experiences with an IMS-Aware Location Service Enabler on top of an Experimental Open Source IMS Core Implementation", Journal of Mobile Multimedia, vol. 2, No. 3, 2006, pp. 189-224.

(Continued)

*Primary Examiner* — Gregory Sefcheck
*Assistant Examiner* — Srinivasa Reddivalam
(74) *Attorney, Agent, or Firm* — Matthew Chung; Roberts Mlotkowski Safran & Cole, P.C.

(57) ABSTRACT

An architecture and method is provided for call routing using both IMS and non-IMS frameworks. The method includes receiving presence information of a third party from a non-IP Multimedia Subsystem (IMS) network device. The method further includes routing the third party to at least one callee designated device based on configurable preferences provided by the callee and correlated to presence information using an IMS compliant component. The method additionally includes providing a charging record for the routing on an IMS complaint charging platform.

19 Claims, 4 Drawing Sheets

(51) Int. Cl.
  *H04L 12/58* (2006.01)
  *H04M 3/22* (2006.01)
  *H04M 3/42* (2006.01)
  *H04L 29/08* (2006.01)

(56) References Cited

U.S. PATENT DOCUMENTS

| | | |
|---|---|---|
| 2006/0052113 A1 | 3/2006 | Ophir et al. |
| 2007/0061397 A1 | 3/2007 | Gregorat et al. |
| 2007/0087731 A1 | 4/2007 | Karlsson et al. |
| 2007/0156909 A1 | 7/2007 | Osborn et al. |
| 2007/0264985 A1 | 11/2007 | Kapur et al. |
| 2007/0270123 A1 | 11/2007 | Cai et al. |
| 2007/0282911 A1 | 12/2007 | Bantukul et al. |
| 2007/0299927 A1* | 12/2007 | Knauerhase ............ 709/206 |
| 2008/0070543 A1 | 3/2008 | Matuszewski et al. |
| 2008/0182548 A1* | 7/2008 | Pattison et al. ............ 455/406 |

OTHER PUBLICATIONS

Roxburgh et al., "Reachability' in converged IMS services—a BT Alcatel-Lucent Collaboration", BT Technology Journal, vol. 25, No. 2, Apr. 2007, pp. 200-210.

Guerrero et al., "QoS Management in Fixed Broadband Residential Gateways", MMNS 2005, LNCS 3754, pp. 338-349.

* cited by examiner

SYSTEM AND METHOD TO INITIATE A PRESENCE DRIVEN PEER TO PEER COMMUNICATIONS SESSION ON NON-IMS AND IMS NETWORKS

FIELD OF THE INVENTION

The invention generally relates to a method and system of call routing and, in particular, to an architecture and method of call routing using both IMS and non-IMS frameworks.

BACKGROUND

Faced with an increasingly difficult challenge in growing both average revenue per user (ARPU) and numbers of subscribers, network carriers are trying to develop a host of new products, services, and business models based on data services. One such service is call routing. While many advances have been made in the Value Added Services (VAS) domain in general, not much has been accomplished in the callee centric control area.

Callee-centric services include presence-based interactive communication services. In such services, the callee can publish, in real time, their presence information to callers (presence watchers) subscribing to the service. For example, a message can be generated and transmitted to the caller based on the callee's presence information, but this is limited in scope. Illustratively, existing presence systems provide only limited callee presence information to the caller in a response message. Furthermore, the callee is not able to control the content of missed call response messages according to different authorities or priorities granted to the caller by the callee. That is, current presence systems do not allow a callee to provide different presence information to different callers.

Within the telecommunications domain, presence holds promise for a class of new applications and value added services to drive data ARPU (as opposed to voice based ARPU). By definition, presence refers to a user's current status on a telecommunications network, and also optionally indicates the availability of a specific channel of communication. For example:
- A status indicating that a person is logged into an instant messaging platform and is available to chat;
- A status indicating that a person's phone is on and is not busy; or
- A status indicating that a person is on his phone and talking (voice session active).

A consolidated view of a person's presence (called a "presentity") is depicted by a presence XML document that the presence server stores. Most people commonly associate presence with instant messaging. In terms of instant messaging, people have different levels of messages determining their availability. Many times an instant message client may have people listed as available, away, do not disturb, or offline. However, instant messaging uses a limited context of presence in general. Under these circumstances, presence does not indicate a communication preference; it only describes the availability of the individual.

Accordingly, there exists a need in the art to overcome the deficiencies and limitations described hereinabove.

SUMMARY

In a first aspect of the invention, a method comprises receiving presence information of a third party from a non-IP Multimedia Subsystem (IMS) network device. The method further comprises routing the third party to at least one callee designated device based on configurable preferences provided by the callee and correlated to presence information using an IMS compliant component. The method additionally comprises providing a charging record for the routing on an IMS complaint charging platform.

In another aspect of the invention, a computer program product comprises a computer usable storage medium having readable program code tangibly embodied in the storage medium. The computer program product is operable to: receive presence information from both IMS and non-IMS network devices; route presence information from the non-IMS network devices to IMS compliant presence components; route call information received from either of the IMS or non-IMS network devices to a callee based on configurable preferences provided by the callee and correlated to the presence information; and generate a charge record for the routing on an IMS complaint charging platform.

In another aspect of the invention, a system for call routing applications comprises a computer infrastructure. The computer infrastructure is operable to: route presence information from both non-IMS network devices and IMS network devices to IMS compliant presence components; route call information received from the non-IMS network devices and IMS network devices to a callee based on configurable preferences provided by the callee and correlated to the presence information on the IMS compliant presence components; and send charging information for the routing to an IMS complaint charging platform associated with the IMS compliant presence components.

In another aspect of the invention, a system comprises an IMS presence server configured to receive presence information from IMS compliant network devices. The system further comprises a non-IMS component configured to receive presence information from non-IMS compliant network devices and communicating the presence information from the non-IMS compliant network devices to the IMS presence server. The system further comprises an IMS compliant charging platform communicating with the IMS presence server and providing charging records for the presence information received from the IMS presence server for both the IMS compliant network devices and the non-IMS compliant network devices.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
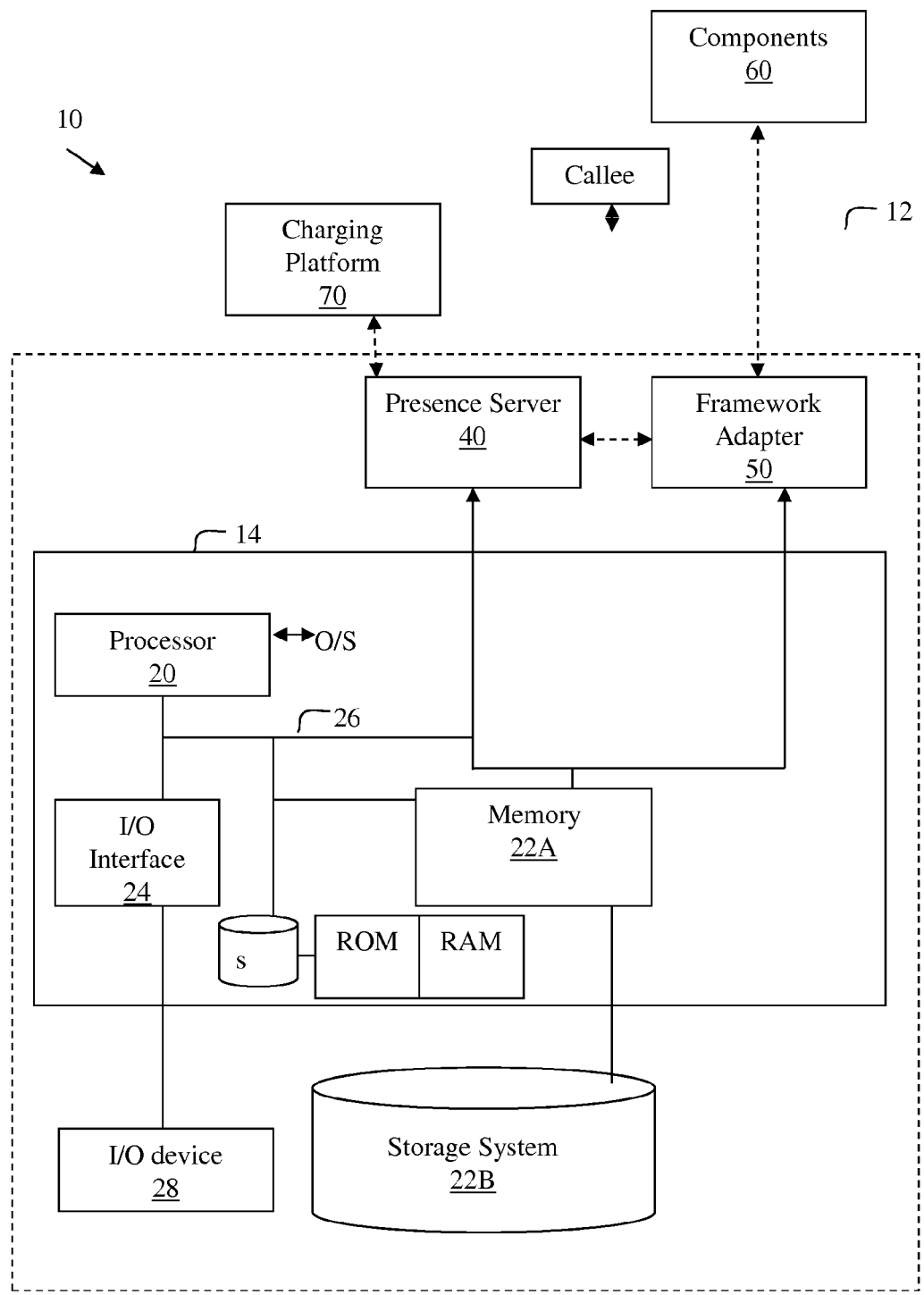
FIG. 1 shows an illustrative environment for implementing processes in accordance with the present invention.

The invention generally relates to a method and system of call routing and, in particular, to an architecture and method of call routing using both IP Multimedia Subsystem (IMS) and non-IMS frameworks. More specifically, the present invention provides a subscriber configurable context based system and method to initiate a presence driven peer to peer communications session on IMS and non-IMS based telecommunications networks. As such, the present invention is network agnostic and supports IMS and non-IMS network elements, including the integration of a single IMS compliant charging platform for both IMS and non-IMS networks. Those of skill in the art should understand that IMS is an architectural framework for delivering Internet protocol multimedia to mobile users. To ease the integration with the Internet, IMS as far as possible uses IETF (i.e., Internet) protocols such as Session Initiation Protocol (SIP).

The present invention does not leverage the SMSC or MMSC infrastructure to enable participation in an IMS network. Instead, the present invention provides a notification model that can drive communications sessions based on status changes, while also factoring in location in IMS and non-IMS networks. The presence based foundational service model of the present invention can also be used to drive other types of services in both IMS and non-IMS contexts. The present invention is also subscriber driven allowing subscribers to use location and presence to determine appropriate means of communicating with one another.

Advantageously, the invention thus allows a callee (subscribing user) to configure routing rules in a customizable manner that will ensure the callee is always reachable via a desired communication channel, e.g., regardless that the callee and caller (whose presence has been detected) are on different (IMS or non-IMS) network elements. The present invention achieves these advantages by using a flexible messaging gateway-based framework to deliver presence information over multiple channels, including Extensible Messaging and Presence Protocol (XMPP).

In implementation, the present invention solves many practical issues that otherwise have curtailed the realization of rich presence based services to end subscribers. These issues include, for example, Many telecommunications networks are in the process of converting over to IMS based cores, while still having to support millions of subscribers with non IMS enabled handsets;

Presence sources include a variety of non-IMS endpoints causing integration complexity including IM sessions, legacy handsets and Data cards;

The business models that can be exposed and realized as a result of exposing presence are still unclear; and Architecture, implementation and deployment complexity is exacerbated by the fact that most of the application/service providers are not SIP aware and will probably not migrate to being SIP aware.

Also, while the IMS reference architecture and related specifications provides for the definition of a presence server and defines RPID and PIDF formats for a presence XML document, such specification is very focused on being in a communications environment where the default signaling is all based on SIP. In reality of course, SIP is rarely used outside the telecommunications network. Additionally, while the parlay X specification provides for terminal status information, it too has specific limitations namely, that the actual definition is very constrained and the specification does not cater to non-SOAP based end points, which is also very constraining. The present invention, though, provides a means to overcome these constraints as discussed in more detail below.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server 12 that can perform the processes described herein using the computer program code. In particular, the server 12 includes a computing device 14. The computing device 14 can be resident on a carrier network infrastructure or other third party service provider (any of which is generally represented in FIG. 1).

The illustrative environment 10 also includes a presence server 40 and a framework adapter 50 (both of which can be a module or program control) configured to make the computing device 14 operable to perform the services described herein. The framework adapter 50 is preferably a non-IMS framework adapter configured to communicate with non-IMS components such as an XMPP gateway, radius server and home location register, all shown generally as component 60. The presence server 40 and framework adapter 50 can be one or more computing modules on the same or different computing infrastructure, and can be implemented by a service provider such as, for example, a network carrier. By using this system and methodology, the network carrier will not have to make any significant infrastructure investments, as the preexisting infrastructure is utilized with the present invention.

In implementation, the combination of the presence server 40 and framework adapter 50 provides an efficient way to provide the advantages of the present invention. For example, the presence server 40 and framework adapter 50 provides the ability to factor IMS based and non-IMS based presence, given the preponderance of non-IMS networks. The framework adapter 50 can also communicate with a charging platform 70, via the presence server 40. In this way, the non-IMS networks can correlate notifications to a charge record for integration into an existing charging platform (such as one based on diameter) using the functionality of the presence server 40. The charging platform 70 is discussed in more detail below.

More specifically, by using the presence server 40 and framework adapter 50 in combination with the other features of the computing infrastructure 14, the illustrative environment 10 is configured to allow a callee (subscriber user) to select a particular delivery channel to be notified when an individual's presence is detected, independent of the channel that is being used by the detected individual or the subscriber triggering the notification. This being the case, the present invention is network agnostic, which focuses on a notification model that can drive communications sessions based on status changes, while also factoring in location in IMS and non-IMS networks. This allows the illustrative environment to be a presence based foundational service model that could be used to drive other types of services in both IMS and non-IMS contexts.

The illustrative environment 10 is also configured to allow network based triggers to sense status changes as opposed to the user setting these triggers. This is accomplished using, for example, the functionality of the presence server 40. For example, the illustrative environment 10 is configured to allow a subscriber to specify a notification channel to be notified when a specific subscriber (or set of subscribers) changes network status and therefore the inferred availability on a particular communications channel. In other words, the illustrative environment 10 provides the ability for the subscriber to select a particular delivery channel to be notified, independent of the channel that is being changed by the subscriber triggering the notification.

As a non-limiting illustrative example, in operation, the callee can set up different rules (preferences) to accept different types of communications from different individuals. These rules can be stored in the storage system 22B. The rules provide the advantage of true presence, capable of correlating a subscribing individual's availability with what methods a person may use to contact the subscribing individual. Under these auspices, the subscribing individual (e.g., callee) can set a preference to only be contacted via SMS (short message service) or e-mail, for example, even though the person whose presence has been detected is on a SIP based device and presence is detected by the framework 50.

By way of a more specific non-limiting illustrative example, subscriber "X" can log into the system and register a preference to be notified by any type of message such as, for example, an SMS message when individual "Y" logs onto an instant messaging system (IM). The preferences can be stored in the storage system 22B, which communicates with the presence server 40 and the framework 50 via a bus 26 or other communications link.

This same procedure can be used for any number of devices and for any number of individuals. By way of another example, subscriber "X" can log into the system and register to be notified by an IM message when a friend "Z" turns on a cellular telephone or SIP compliant device. When subscriber "X" logs into the IM platform, the system (e.g., framework 50 of FIG. 1) detects such an occurrence and sends an IM from a notification bot (robot) via a XMPP/SIP gateway infrastructure. With these examples those of skill in the art should understand that the illustrative environment 10 supports changes to a callee preference. The preferences can be stored directly in the presence server 40 or the storage system 22B, e.g., database, as well as in a HLR or HSS (shown in FIG. 2).

In embodiments, the communications channels supported by the present invention include, for example and in no particular order, (i) Voice Sessions (SS7); (ii) Generic Cellular data sessions (Radius authenticated packet networks); (iii) Generic IMS based sessions, via SIP signaling channels; and/or (iv) Instant Messaging Sessions (XMPP enabled via a gateway). The channels supported by the present invention to notify the subscriber include, for example and in no particular order, (i) Generic SIP based notifications; (ii) SMS via the SMSC infrastructure; (iii) MMS via an existing MMSC based infrastructure; (iv) WAP via a WAP gateway (or set of gateways); (v) IM (Via an XMPP based IM gateway); (vi) SOAP or REST based Web Service invocation which needs to be provisioned with an end point; and/or (vii) Distinct Ring.

In yet another embodiment, the system and method provides a charging platform 70 to provide charging models for services rendered. The charging platform 70 may be maintained, deployed, created and/or serviced by the service provider. The charging platform 70 is designed to generate a charging record for services rendered to a subscriber, e.g., the callee will be charged for the services rendered based on the charging model implemented by the system and method of the invention. In embodiments, the service provider can calculate an amount to be charged, based on many different considerations and generate the charging record to be sent to the charging platform 70. In turn, the charging platform 70 can generate an invoice and/or deduct a usage charge from an account of the subscriber (callee). The charging platform 70 also supports flexible charging models supported via an IMS compliant Customer Care Framework (CCF), and now can even be implemented using non-IMS based networks using the combination of the presence server 40 and framework adapter 50.

The computing device 14 also includes a processor 20, memory 22A, an I/O interface 24, and the bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU. The computing device 14 also includes an I/O device 28. The I/O device 28 can be, for example, any device that enables an individual to interact with the computing device 14 or any device that enables the computing device 14 to communicate with one or more other computing devices using any type of communications link. The external I/O device/resource 28 may be for example, a display of a computing device such as a personal digital assistant (PDA).

In general, the processor 20 executes computer program code, which is stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. The customer may be, for example, the subscribing user (callee). In return, the service provider can receive payment from the customer(s) under a subscription and/or fee agreement and/or the service provider can receive payment.

Exemplary Architecture

Figure 2:
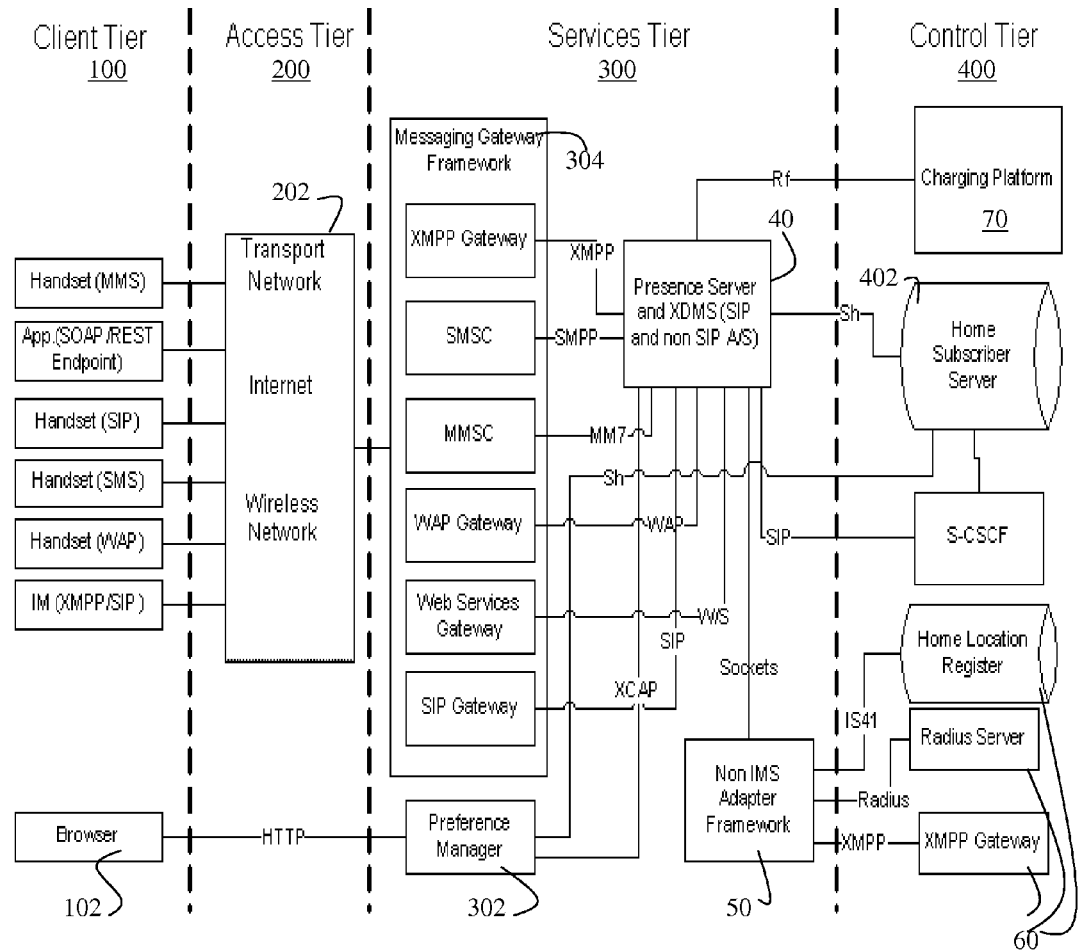
FIG. 2 shows an exemplary architect implementing aspects of the present invention.

FIG. 2 shows an exemplary architecture in accordance with aspects of the invention. In particular, FIG. 2 shows a client tier 100, an access tier 200, a services tier 300 and a control tier 400. The client tier 100 can include any number of different network elements such as, for example, (i) MMS handset; (ii) SIP handset; (iii) SMS handset; (iv) WAP handset; (v) SOAP/REST based application; and/or (vi) XMPPP/SIP IM based device. The client tier 100 also includes a browser 102, which communicates with a preference manager 302 in the services tier 300. In embodiments, the preference manager 302 can store the preferences (rules) of the subscriber such as, for example, which communication channels to use for notification when certain individuals are detected on a network (regardless of whether the individuals are using an IMS or non-IMS compliant device). The browser may be equivalent to the I/O device of FIG. 1.

The different network elements communicate with the access tier 200 and more specifically a transport network 202 such as, for example, the Internet or a wireless network. In turn, the transport network 202 communicates with a messaging gateway framework 304 in the services tier 300. The messaging gateway framework 304 includes, for example, an XMPPP Gateway, Short Message Service Center (SMSC), Multimedia Messaging Service, (MMSC), Wireless Application Protocol (WAP) Gateway, Web Services Gateway and a Session Initiation Protocol (SIP) Gateway.

In the services tier 300, the transport network 202 and preference manager 302 communicate with the presence server 40, via the appropriate communication protocols. Also, the presence server 40 communicates with the non-IMS adapter framework 50. The non-IMS adapter framework 50 allows the detection of presence information for non-IMS compliant devices, which can then be handed off to the presence server 40 for further processing such as, for example, providing notification to the client tier 100 via the preference manager 302. More specifically, the presence server 40 can provide the presence information of a third party (via the non-IMS adapter framework 50 for non-IMS compliant devices such as SIP devices) to the preference manager 302 which, in turn, will look up the stored rules (preferences) and provide a notification to the subscribing user via a requested channel. In an alternative embodiment, the rules can be stored in the HSS or HLR of the client tier 400.

In embodiments, the non-IMS adapter framework 50 and the presence server 40 communicate with components in the control tier 400. For example, the non-IMS adapter framework 50 communicates with non-IMS components 60, e.g., XMPP gateway, the radius server and the HLR. The HLR is a central database that contains details of each mobile subscriber that is authorized to use a GSM core network. The HLR stores details of every SIM card issued by the network carrier. The HLR directly receives and processes MAP transactions and messages from elements in the GSM network, for example, the location update messages received as mobile devices roam.

The presence server 40, on the other hand, communicates with the HSS (Home Subscriber Server) 402 and the charging platform 70. The HSS (or User Profile Server Function (UPSF)) 402 is a master user database that supports the IMS network entities that actually handle calls. In embodiments, the HSS 402 contains the subscription-related information (user profiles), performs authentication and authorization of the user, and can provide information about the user's physical location. It is similar to the HLR, but for IMS networks. In embodiments, the HSS can store the subscriber preferences. The HSS can be represented as the storage system 22B of FIG. 1

As the presence server 40 communicates with both the non-IMS adapter framework 50 and the HSS 402, it is possible to obtain presence information regardless of whether presence information is obtained by the presence server 40 or the non-IMS adapter framework 50. Also, as the presence server 40 communicates with both the non-IMS adapter framework 50 and the charging platform 70, it is possible to generate an invoice and/or deduct a usage charge from an account of the subscriber (callee) using a single IMS compliant charging platform 70, regardless of whether the detected third party is on an IMS or non-IMS network.

Exemplary Processes

Figure 3:
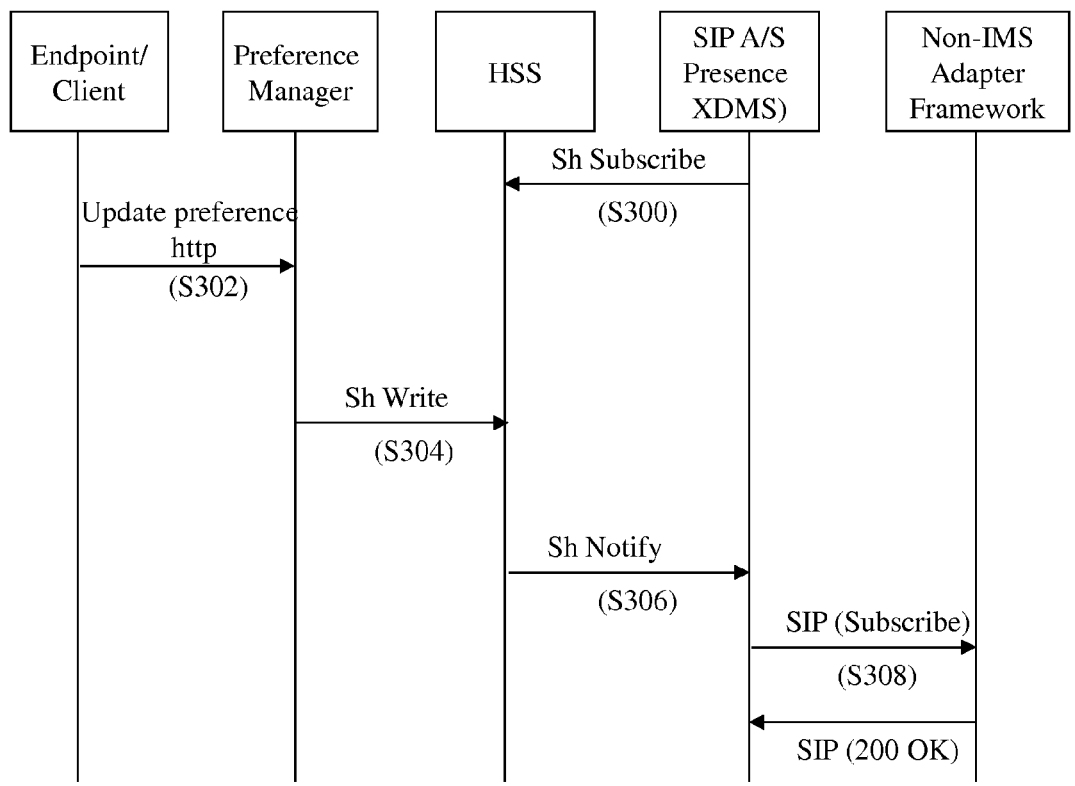
FIG. 3 is a swim lane diagram showing a process in accordance with aspects of the present invention.
Figure 4:
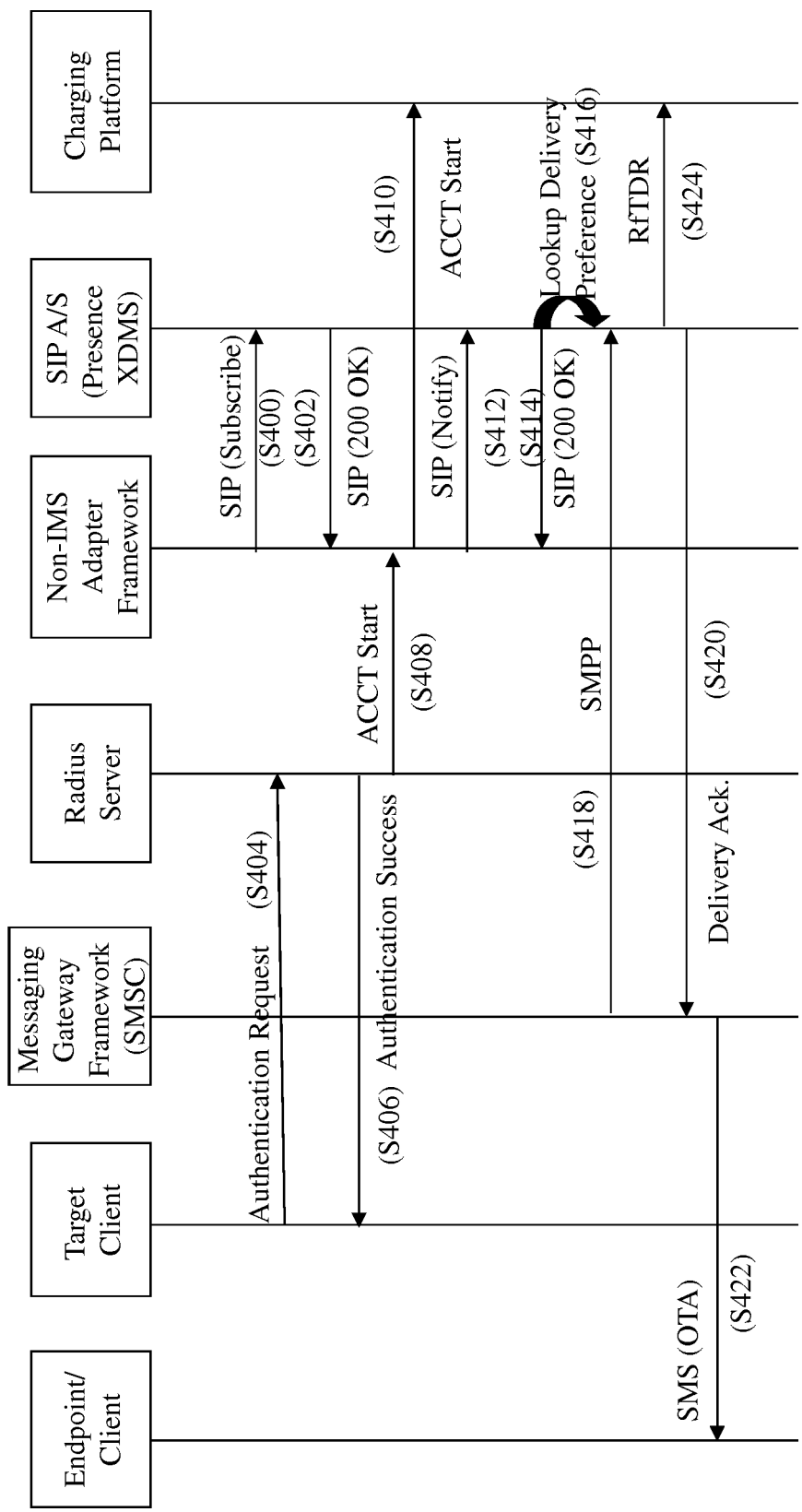
FIG. 4 is a swim lane diagram showing a process in accordance with aspects of the present invention.

FIGS. 3 and 4 illustrate exemplary processes in accordance with the present invention. The steps of FIGS. 3 and 4 may be implemented on the computer infrastructure of FIG. 1 and/or the architecture of FIG. 2, for example. The flow diagrams (swim lane diagrams) in FIGS. 3 and 4 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

FIG. 3 shows a sequence diagram depicting the provisioning flow that needs to be enabled prior to the call flow executing at runtime in accordance with aspects of the invention. More specifically, at step S300, the SIP Application Server (Presence and XDMS) subscribes to be notified by the HSS when changes are made to the subscriber profile. This is performed using the Sh based diameter sub-protocol. As a result, when a change to a subscriber profile occurs, the SIP A/S (Application Server) is notified.

At step S302, the subscribing user logs into the preference manager and asks to be notified with an SMS (or other type of message) message when a predefined entity logs into the data network. This results in a Sh notification being sent to the Diameter based HSS at step S304, which then notifies the SIP Application Server at step S306. At step S308, the SIP application sends a SIP subscribe request to the non-IMS adapter framework, e.g., SIP A/S (Presence XDMS). The non-IMS adapter framework is the tie-point to the Radius Server on the network, which controls data session access in the non-IMS network. At step S310, the non-IMS framework sends back a 200 OK to the SIP application.

FIG. 4 shows an example call flow (runtime associated with the provisioning flow in FIG. 2) associated with the notification delivery in accordance with aspects of the invention. More specifically, at step S400, the SIP Application Server sends a SIP subscribe request to the non-IMS adapter framework. At step S402, the non-IMS adapter framework receives a 200 OK. At step S404, the target device asks the Radius infrastructure if it can authenticate to the data network. At step S406, the Radius infrastructure permits the authentication and generates a standard START record to the charging platform via steps S408 and S410.

More specifically, at step S408, the Radius infrastructure sends an ACCT start to the non-IMS adapter framework. At step S410, the non-IMS adapter framework forwards the START to the charging platform. Asynchronously, the non-IMS adapter framework intercepts the Start Record and generates a SIP notify for that user to the SIP A/S, at step S412. At step S414, the SIP A/S returns a 200 OK.

At step S416, the SIP A/S looks up its preferences (based on the earlier HSS notification) and determines that the messaging Gateway (SMSC) needs to be requested to send a message to the subscriber. At step S418, the SMSC is contacted via the SMPP protocol by the SIP A/S. At step S420, the SIP A/S provides an acknowledgement. At step S422, the SMSC delivers the OTA (Over the Air) SMS to the requesting subscriber's handset. At step S424, the SIP A/S sends an Rf transaction using the Rf Diameter sub-protocol. That is, at step S424, the charging platform receives a rfTDR message that the notification process has been completed (in order to generate an invoice). The user receives the SMS message (or other type of message) and acts accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method comprising:

receiving presence information of a third party from both non-IP Multimedia Subsystem (IMS) network devices and IMS network devices;

routing the presence information of the third party from both non-IMS network devices and IMS network devices to IMS compliant presence components;

routing the presence information of the third party received from both non-IMS network devices and IMS network devices to at least one callee designated device based on configurable preferences provided by the callee and correlated to the presence information on the IMS compliant components; and providing a charging record for the routing on an IMS compliant charging platform associated with the IMS compliant presence components, wherein the configurable preferences specify a delivery channel to transmit the presence information of the third party, independent of the channel that is being used by the third party;

the presence information includes a notification of an availability of the third party on a particular communication channel; and the particular communication channel is in the IMS network or in the non-IMS network.

2. The method of claim 1, wherein the callee designated device is a presence document compatible device.

3. The method of claim 1, wherein the routing is independent of a triggering device of the at least one callee.

4. The method of claim 1, wherein the receiving presence information is received by a presence server using Session Initiation Protocol (SIP) for integration into the IMS compliant component.

5. The method of claim 1, wherein the receiving presence information is received by a non-IMS adapter framework and provided to the IMS compliant component.

6. The method of claim 5, wherein the IMS compliant presence server communicates non-IMS presence information to the IMS compliant charging platform.

7. The method of claim 5, wherein the at least one callee designated device includes (i) MMS handset; (ii) SIP handset; (iii) SMS handset; (iv) WAP handset; (v) SOAP/REST based application; and/or (vi) XMPP/SIP IM based device.

8. The method of claim 1, further comprising providing presence on multiple channels that include Extensible Messaging and Presence Protocol (XMPP) supported public IM gateways.

9. The method of claim 1, wherein the receiving presence information and call routing is supported by SIP notification into IMS platform components, and connectivity to the IMS compliant charging platform.

10. The method of claim 1, wherein the steps are provided on a computing infrastructure which is at least one of maintained, deployed, created and supported by a service provider.

11. The method of claim 1, wherein the steps are provided on a software component, a hardware component or a combination of the software component and the hardware component.

12. A computer program product comprising a computer readable hardware storage device having readable program code tangibly embodied in the storage device, the computer program product being operable to:

receive presence information from both IMS and non-IMS network devices;

route the presence information from both the non-IMS network devices and the IMS network devices to IMS compliant presence components;

route the presence information of a third party received from both of the IMS and non-IMS network devices to a callee designated device based on configurable preferences provided by the callee and correlated to the presence information on the IMS compliant components; and generate a charge record for the routing on an IMS compliant charging platform associated with the IMS compliant presence components, wherein the configurable preferences specify a delivery channel to transmit the presence information of the third party, independent of the channel that is being used by the third party;

the presence information includes a notification of an availability of the third party on a particular communication channel; and the particular communication channel is in the IMS network or in the non-IMS network.

13. The computer program product of claim 12, wherein the computer program product is further operable to receive the presence information using a telecommunications network presence platform via SIP signaling.

14. The computer program product of claim 12, wherein the presence information is received by a non-IMS component and provided to at least one of the IMS compliant presence components.

15. The computer program product of claim 14, wherein the computer program product is further operable to store the configurable preferences on a database.

16. The computer program product of claim 15, wherein the configurable preferences provide routing information to the callee from the third party, independent of a third party network device.

17. The computer program product of claim 12, wherein the computer program product is provided on a computing infrastructure which is at least one of maintained, deployed, created and supported by a service provider.

18. The computer program product of claim 12, wherein the presence information is received from the non-IMS network devices and the configurable preferences provided by the callee are received from an IMS network device.

19. A system, comprising:

an IMS presence server configured to receive presence information from IMS compliant network devices;

a non-IMS component configured to receive presence information from non-IMS compliant network devices and communicating the presence information from the non-IMS compliant network devices to the IMS presence server;

an IMS compliant component configured to route the presence information of a third party received from both the non-IMS compliant network devices and the IMS compliant network devices to a callee based on configurable preferences provided by the callee and correlated to the presence information on IMS compliant presence components; and an IMS compliant charging platform communicating with the IMS presence server and providing charging records for the presence information received from the IMS presence server for both the IMS compliant network devices and the non-IMS compliant network devices, wherein the configurable preferences specify a delivery channel to transmit the presence information of the third party, independent of the channel that is being used by the third party;

the presence information includes a notification of an availability of the third party on a particular communication channel; and the particular communication channel is in the IMS network or in the non-IMS network.

* * * * *